(12) United States Patent
Lin et al.

(10) Patent No.: US 11,539,933 B2
(45) Date of Patent: Dec. 27, 2022

(54) 3D DISPLAY SYSTEM AND 3D DISPLAY METHOD

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/363,017

(22) Filed: Jun. 30, 2021

(65) Prior Publication Data

US 2022/0124300 A1 Apr. 21, 2022

(30) Foreign Application Priority Data

Oct. 21, 2020 (TW) ................................. 109136366

(51) Int. Cl.
| | |
|---|---|
| *H04N 13/261* | (2018.01) |
| *H04N 13/359* | (2018.01) |
| *H04N 13/398* | (2018.01) |
| *H04N 13/302* | (2018.01) |

(52) U.S. Cl.
CPC ......... *H04N 13/261* (2018.05); *H04N 13/302* (2018.05); *H04N 13/359* (2018.05); *H04N 13/398* (2018.05)

(58) Field of Classification Search
CPC .. H04N 13/261; H04N 13/302; H04N 13/359; H04N 13/398
USPC ......................................................... 348/54
See application file for complete search history.

(56) References Cited

U.S. PATENT DOCUMENTS

| | | | | |
|---|---|---|---|---|
| 2012/0287252 | A1* | 11/2012 | Tsuchida | G09G 3/3677 348/51 |
| 2014/0143733 | A1* | 5/2014 | Jung | H04N 13/261 715/848 |
| 2014/0300566 | A1* | 10/2014 | Lee | H04N 13/261 345/173 |
| 2015/0242044 | A1 | 8/2015 | Nam et al. | |
| 2016/0165221 | A1 | 6/2016 | Duffy | |
| 2016/0286208 | A1* | 9/2016 | Drouin | H04N 13/158 |
| 2017/0180700 | A1* | 6/2017 | Cho | H04N 13/111 |
| 2019/0037137 | A1* | 1/2019 | Toksvig | G06F 3/011 |

(Continued)

FOREIGN PATENT DOCUMENTS

| | | |
|---|---|---|
| TW | 201230776 | 7/2012 |
| TW | 201303695 | 1/2013 |
| TW | 201916682 | 4/2019 |

*Primary Examiner* — Tung T Vo
(74) *Attorney, Agent, or Firm* — JCIPRNET

(57) ABSTRACT

A 3D display system and a 3D display method are provided. The 3D display system includes a 3D display, a memory and one or more processors. The memory records a plurality of modules, and the processor accesses and executes the modules recorded by the memory. The modules include a bridge interface module and a 3D display service module. When an application is executed by the processor, the bridge interface module creates a virtual extend screen, and moves the application to the virtual extend screen. The bridge interface module obtains a 2D content frame of the application from the virtual extend screen by a screenshot function. The 3D display service module converts the 2D content frame into a 3D format frame by communicating with a third-party software development kit, and provides the 3D format frame to the 3D display for displaying.

11 Claims, 4 Drawing Sheets

(56) References Cited

U.S. PATENT DOCUMENTS

2019/0068942 A1* 2/2019 Schiarizzi ................ G06T 7/90
2019/0279407 A1* 9/2019 McHugh ................ G06T 11/60
2021/0247882 A1* 8/2021 Norman ................ G06F 3/0484

* cited by examiner

3D DISPLAY SYSTEM AND 3D DISPLAY METHOD

CROSS-REFERENCE TO RELATED APPLICATION

This application claims the priority benefit of Taiwan application no. 109136366, filed on Oct. 21, 2020. The entirety of the above-mentioned patent application is hereby incorporated by reference herein and made a part of this specification.

TECHNICAL FIELD

The invention relates to a display system, and more particularly, relates to a 3D display system and a 3D display method.

BACKGROUND

With the vigorous development of 3D display technology, 3D displays can provide people with a visually immersive experience. 3D display technology can be divided into a glasses-type 3D image display technology and a naked-view 3D image display technology. Although the glasses-style 3D image display technology is relatively mature, 3D glasses are inconvenient to use. Therefore, the naked-view 3D image display technology has gradually become the focus of various industries' urgent development.

The naked-view 3D image display technology also uses the principle of binocular parallax to allow the eyes to receive different images through the optical technology of the screen. In the naked-view 3D image display technology, compared to a mask-type 3D image display technology, a lens-type 3D image display technology has the advantage of better light transmittance and thus can provide a brighter picture to the viewer in image presentation. However, regardless of the types of the naked-view 3D image display technology, a naked-view 3D image content suitable for the naked-view 3D display to display needs to be generated according to naked-view 3D display specifications, hardware design and user-related parameters. However, currently there are not many naked-view 3D image contents on the market. Therefore, even if the user has a naked-view 3D display, the user still cannot fully and arbitrarily enjoy the displaying effect brought by the naked-view 3D display.

SUMMARY

In view of this, the invention proposes a 3D display system and a 3D display method, which allow users to fully experience the displaying effect brought by the 3D display.

An embodiment of the invention provides a 3D display system, which includes a 3D display, a memory and one or more processors. The memory records a plurality of modules, and the processor is connected to the 3D display and the memory to access and execute the modules recorded by the memory. The modules include a bridge interface module and a 3D display service module. When an application is executed by the processor, the bridge interface module creates a virtual extend screen, and moves the application to the virtual extend screen. The 3D display service module obtains the 2D content frame of the application from the bridge interface module, converts the 2D content frame into a 3D format frame by communicating with a third-party software development kit, and provides the 3D format frame to the 3D display for displaying.

An embodiment of the invention provides a 3D display method adapted to a 3D system. The method includes the following steps. When an application is executed by a processor, a virtual extend screen is created, and the application is moved to the virtual extend screen. A 2D content frame of the application is obtained from the virtual extend screen by a screenshot function. The 2D content frame is converted into a 3D format frame by communicating with a third-party software development kit. The 3D format frame is provided to a 3D display for displaying.

An embodiment of the invention provides a 3D display system, which includes a 3D display, a memory and one or more processors. The memory records a plurality of modules, and the processor is connected to the 3D display and the memory to access and execute the modules recorded by the memory for executing the following steps. When an application is executed by a processor, a virtual extend screen is created, and the application executed by the processor is moved to the virtual extend screen. A 2D content frame of the application is obtained from the virtual extend screen by a screenshot function. A 3D display parameter associated with the 3D display is obtained. The 2D content frame is converted into the 3D format frame according to the 3D display parameter and the image weaving function, and the 3D format frame is provided to the 3D display for displaying.

Based on the above, in the embodiments of the invention, the 2D content frames of multiple applications may be converted into the 3D format frames that conform to a specific 3D format without any changes to the applications to expand the 3D content that can be displayed on the naked-view 3D display.

To make the aforementioned more comprehensible, several embodiments accompanied with drawings are described in detail as follows.

DETAILED DESCRIPTION

Some embodiments of the disclosure are described in details below by reference with the accompanying drawings, and as for reference numbers cited in the following description, the same reference numbers in difference drawings are referring to the same or like parts. The embodiments are merely a part of the disclosure rather than disclosing all possible embodiments of the disclosure. More specifically, these embodiments are simply examples of systems and methods recited in claims of the invention.

Figure 1:
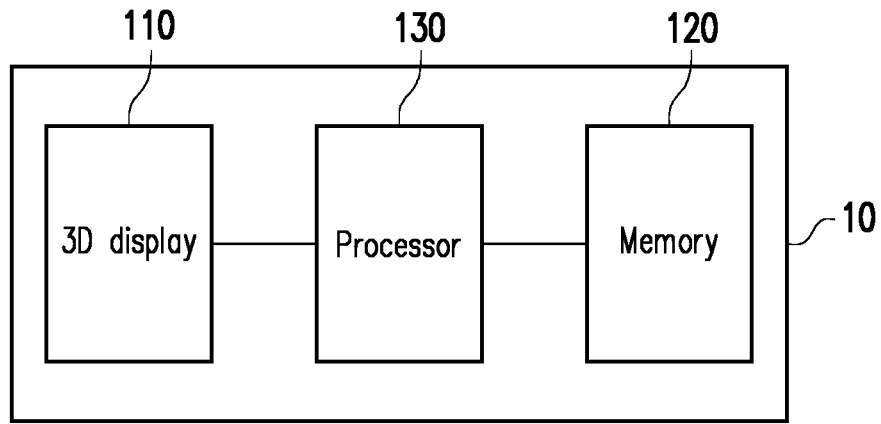
FIG. 1 is a schematic diagram of a 3D display system according to an embodiment of the invention.

FIG. 1 is a schematic diagram of a 3D display system according to an embodiment of the invention. Referring to FIG. 1, a 3D display system 10 may include a 3D display 110, a memory 120 and one or more processors (a processor 130 will be used as an example in the following description). The processor 130 is coupled to the 3D display 110 and the memory 120. The 3D display system 10 may be a single integrated system or a separate system. Specifically, the 3D display 110, the memory 120 and the processor 130 in the 3D display system 10 can be implemented as an all-in-one (AIO) electronic device, such as a notebook computer or a tablet computer. Alternatively, the 3D display 110 may be connected to the processor 130 of a computer system through a wired transmission interface or a wireless transmission interface.

The memory 120 is used to store data and program codes for the processor 130 to access (e.g., an operating system, an application, a driver), and may be a fixed or movable device in any form such as a removable random access memory (RAM), a read-only memory (ROM), a flash memory, a hard disk or a combination thereof. In an embodiment, the memory 120 further includes a memory of an image processing unit.

The processor 130 is coupled to the memory 120, and may be, for example, a central processing unit (CPU), an application processor (AP) or other programmable microprocessors for general purpose or special purpose, a digital signal processor (DSP), an image signal processor (ISP), a graphics processing unit (GPU), or other similar devices, integrated circuits or a combination of the above. The processor 130 can access and execute program codes and software modules recorded in the memory 120 to implement the 3D display method in the embodiment of the invention.

Figure 2:
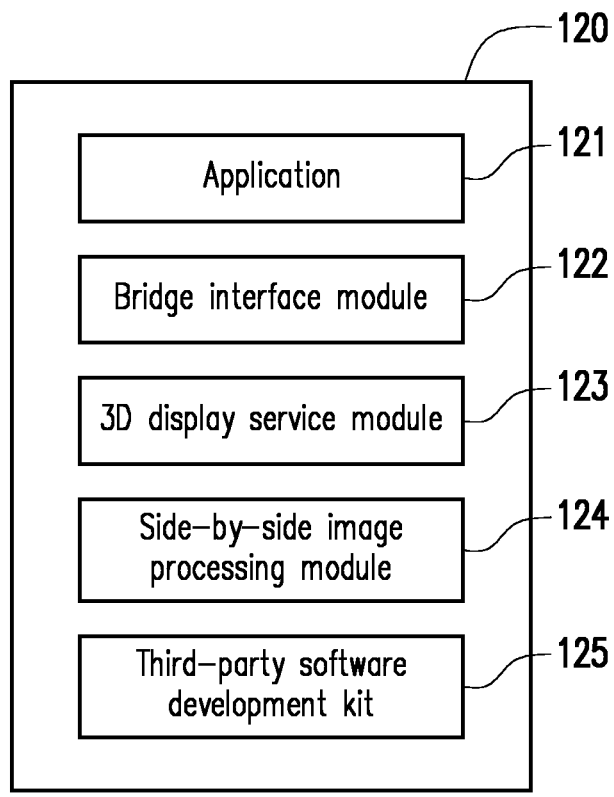
FIG. 2 is a schematic diagram of a 3D display according to an embodiment of the invention.

FIG. 2 is a schematic diagram of multiple modules according to an embodiment of the invention. Referring to FIG. 2, in an embodiment, the memory 120 may store an application 121, a bridge interface module 122, a 3D display service module 123, a side-by-side image processing module 124 and a third-party software development kit 125. In an embodiment, the bridge interface module 122, the 3D display service module 123 and the side-by-side image processing module 124 are, for example, computer programs, procedures or commands, which may be loaded into the processor 130 so that the 3D display system 10 can implement the function of converting a 2D content frame of the application 121 into a 3D format frame. The bridge interface module 122, the 3D display service module 123 and the side-by-side image processing module 124 may be used as, for example, background programs operating in the operating system to implement the method proposed by the embodiment of the invention. The details regarding the same will be described later.

Figure 3:
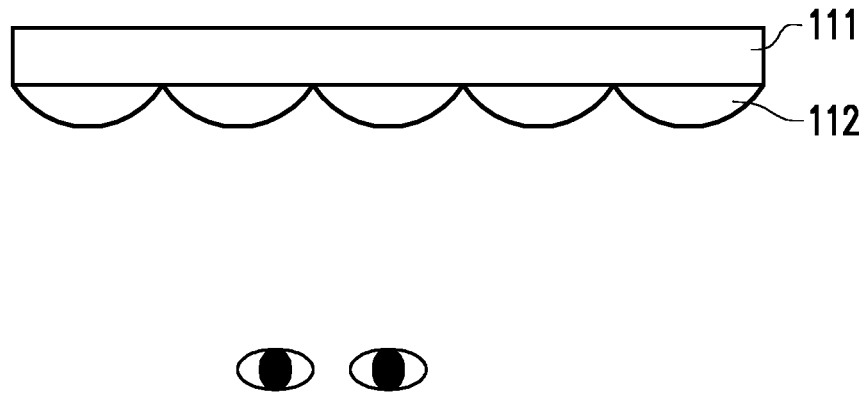
FIG. 3 is a schematic diagram of a 3D display according to an embodiment of the invention.

FIG. 3 is a schematic diagram of a 3D display according to an embodiment of the invention. In an embodiment, the 3D display 110 is a naked-eye 3D display, which can provide different images with aberrations to the left eye and the right eye through the principle of lens refraction, so that the viewer can experience a stereoscopic displaying effect. The 3D display 110 may include a display panel 111 and a lens layer 112. The lens layer 112 is disposed above the display panel 111, and the user sees a screen content provided by the display panel 111 through the lens layer 112. The invention does not limit the type and structure of the display panel 111, and the display panel 111 may also be a self-emissive display panel. The lens layer 112 refracts different display content to different places in the space by refraction of light, so that the human eyes can receive two images with parallax. The structure and implementation of the 3D display 110 are not the focus of the invention and will not be described herein. It should be noted that, in an embodiment, the developer or supplier of the 3D display 110 will provide a third-party software development kit that meets the hardware design specifications of the 3D display 110, This third-party software development kit may be recorded in the memory 120 (e.g., the third-party software development kit 125 stored in the memory 120). Accordingly, the 3D display system 10 assembled with the 3D display 110 can implement the naked-view 3D display function according to the third-party software development kit 125.

Figure 4:
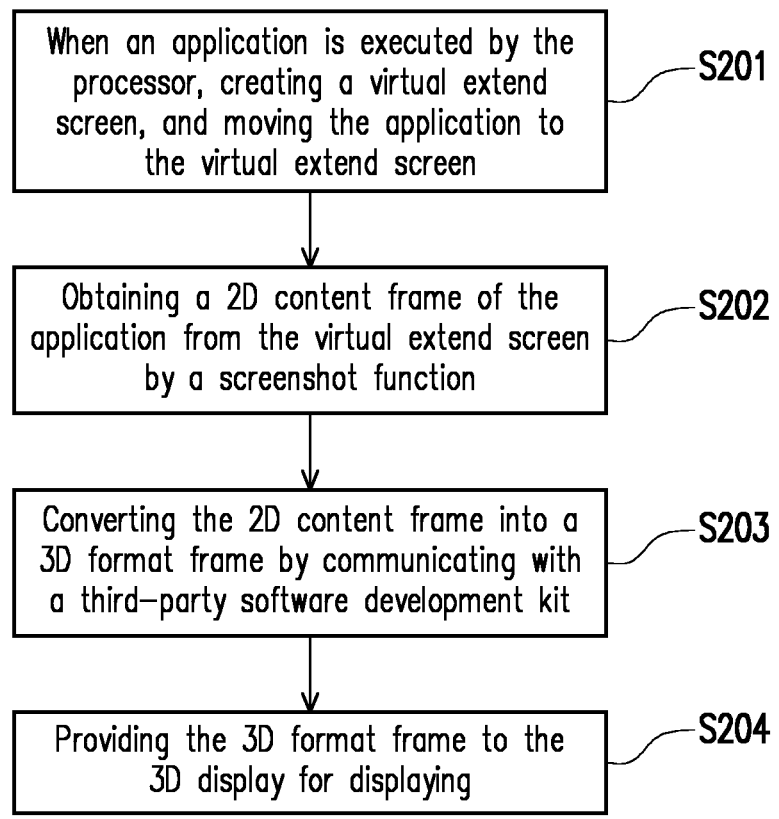
FIG. 4 is a flowchart of a 3D display method according to an embodiment of the invention.

FIG. 4 is a flowchart of a 3D display method according to an embodiment of the invention. Referring to FIG. 1, FIG. 2 and FIG. 4, the method of this embodiment is applicable to the 3D display system 10 in the above-mentioned embodiment. The detailed steps of this embodiment are described below with various components in the 3D display system 10.

In step S201, when the application 121 is executed by the processor 130, the bridge interface module 122 creates a virtual extend screen, and moves the application 121 to the virtual extend screen. Here, the application 121 may include a desktop application, a browser application or the like. In an embodiment, the bridge interface module 122 may use the driver/API of the Windows operating system to create the virtual extended screen, for example. This virtual extend screen will not be displayed on the 3D display 110, but the image processing unit (not shown) of the 3D display system 10 will generate image data of the virtual extended screen and configure a frame buffer space of the virtual extend screen in the memory. The bridge interface module 122 may move a window of the application 121 to the virtual extend screen in response to a user operation. The user operations are, for example, mouse dragging or pressing shortcut keys.

Next, in step S202, the bridge interface module 122 may obtain a 2D content frame of the application 121 from the virtual extend screen by a screenshot function. For example, the bridge interface module 122 may obtain the 2D content frame of the application from the virtual extend screen by using a screen capture technology such as the "Desktop Duplication API" of the Windows operating system. The 2D content frame of the application 121 is, for example, an image content provided by the application 121 operating in a full-screen mode, but the invention is not limited thereto. The 2D content frame may include or exclude a user interface of the application 121. For instance, assuming that the application 121 is a photo playback program, the 2D content frame of the application 121 may be a photo played in the full-screen mode.

In step S203, the 3D display service module 123 converts the 2D content frame into a 3D format frame by communicating with the third-party software development kit 125. Specifically, the 3D display service module 123 may obtain the 2D content frame of the application 121 from the bridge interface module 122. In an embodiment, the bridge interface module 122 may be implemented as an application programming interface (API), so that the 3D display service module 123 can obtain the 2D content frame of the application 121 through the bridge interface module 122. Next, the 3D display service module 123 may convert the 2D content frame into the 3D format frame according to a 3D display parameter provided by the third-party software development kit 125 by using an image weaving function provided by the third-party software development kit 125. In step S204, the 3D display service module 123 provides the 3D format frame to the 3D display 110 for displaying. It can be seen from this that, in an embodiment, the bridge interface module 122 may move the application executed by the processor 130 to the virtual extend screen in response to the user operation. In addition, the 3D display 110 switches from displaying an operation screen associated with the application 121 to displaying the 3D format frame in response to the user operation.

It is worth noting that, in an embodiment, the side-by-side image processing module 124 may receive the 2D content frame of the application 121 from the 3D display service module 123, and determine whether the 2D content frame conforms to a side-by-side image format. If not, the side-by-side image processing module 124 may convert the 2D content frame to conform to the side-by-side image format. Thus, the 3D display service module 123 may convert the 2D content frame conforming to the side-by-side image format into the 3D format frame. Here, an image conforming to the side-by-side image format will include a left-eye image and a right-eye image arranged side by side. In an embodiment, the side-by-side image processing module 124 may convert the 2D content frame to conform to the side-by-side image format through a neural network model.

However, it should be noted that the above-mentioned embodiments are described using the 3D display parameter and the image weaving function provided by the third-party software development kit as an example. Nonetheless, in other embodiments, the functions implemented by the bridge interface module 122, the 3D display service module 123 and the side-by-side image processing module 124 can also be integrated with the third-party software development kit 125. In this case, in an embodiment, the processor 130 may execute the following steps by executing multiple modules in the memory 120. When the application 121 is executed by the processor 130, the processor 130 creates the virtual extend screen, and moves the application 121 to the virtual extend screen. The processor 130 obtains the 2D content frame of the application from the virtual extend screen by the screenshot function. The processor 130 obtains the 3D display parameter associated with the 3D display, such as line of sight information and so on. The processor 130 converts the 2D content frame into the 3D format frame according to the 3D display parameter and the image weaving function, and provides the 3D format frame to the 3D display 110 for displaying.

Figure 5:
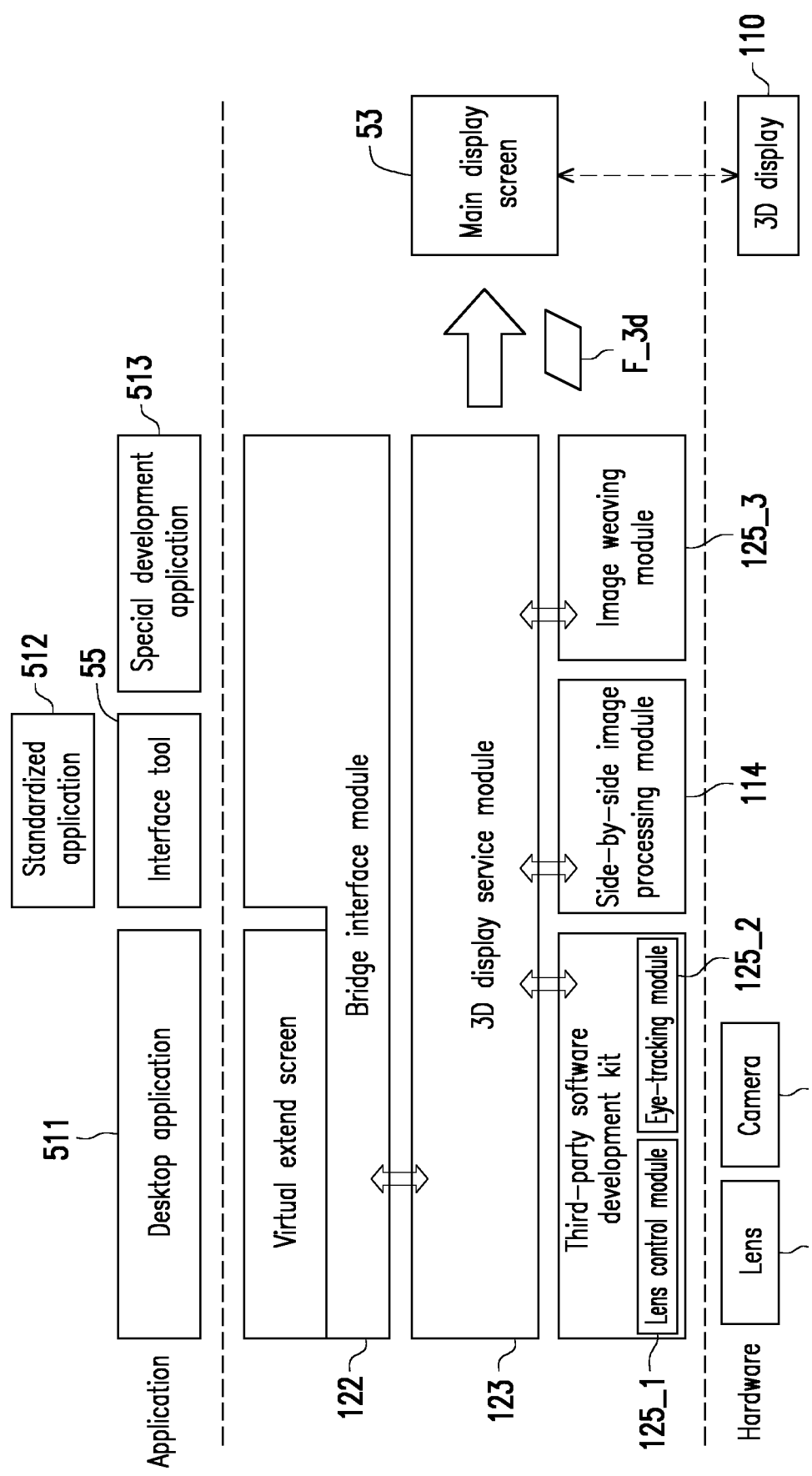
FIG. 5 is a schematic diagram of the software architecture of a 3D display system according to an embodiment of the invention.

FIG. 5 is a schematic diagram of the software architecture of a 3D display system according to an embodiment of the invention. Referring to FIG. 5, the application executable by the 3D display system 10 include a desktop application 511, a standardized application 512 that conforms to the Openxr standard or the Openvr standard and a special development application 513.

In this embodiment, in order to generate a 3D format frame F_3d suitable for display by the 3D display 110 to display according to the 2D content frame of the application, the bridge interface module 122 may obtain a 2D content frame of the desktop application 511, a standardized application 512, or the special development application 513. According to different types of applications, the bridge interface module 122 may use different methods to obtain the corresponding 2D content frame, and the details regarding the same will be described later. In this way, the 3D display service module 123 may convert the 2D content frame into the 3D format frame F_3d according to the 3D display parameter provided by the third-party software development kit 125 by using the image weaving function provided by the third-party software development kit 125. The image weaving function is suitable for converting the image content conforming to the side-by-side image format into the 3D format frame F_3d determined based on the hardware architecture of the 3D display 110 (such as lens architecture or panel pixel design).

In this embodiment, the third-party software development kit 125 may include a lens control module 125_1, an eye-tracking module 125_2 and an image weaving module 125_3.

The lens control module 125_1 is used to control the opening and closing of a lens L1, so that the 3D display 110 can perform a 2D displaying or a 3D displaying. In an embodiment, in response to the user operation for activating a 3D display function detected by the 3D display service module 123, the 3D display service module 123 may control the opening of the lens L1 through the lens control module 125_1, and the eye tracking module 125_2 may detect the user's line of sight information through a camera 140, so that the 3D format frame F_3d can be based on the user's line of sight information. In an embodiment, the eye-tracking module 125_2 may return the 3D display parameter related to the line of sight information to the 3D display service module 123.

In addition, the side-by-side image processing module 124 may detect whether the 2D content frame captured by the bridge interface module 122 conforms to the side-by-side image format. If not, the side-by-side image processing module 124 may generate the 2D content frame conforming to the side-by-side image format, and return the 2D content frame conforming to the side-by-side image format to the 3D display service module 123. After that, the 3D display service module 123 may generate the 3D format frame F_3d by using a library provided by the image weaving module 125_3 and the 3D display parameter.

In this embodiment, the 3D display service module 123 may transfer the 3D format frame to a main display screen 53 so that the 3D display 110 corresponding to the main display screen 53 can display the 3D format frame F_3d. That is, the 3D format frame F_3d is written into a frame buffer space corresponding to the main display screen 53. However, in other embodiments, the 3D display service module 123 can transmit the 3D format frame to the 3D display 110 for display through other wired or wireless transmission technologies.

It should be noted that when the processor 130 executes the desktop application 511 (e.g., when the user operates a drawing software program to draw or uses a multimedia player program to play images), the bridge interface module 122 may move the desktop application 511 to the virtual extend screen in response to the user operation. Next, the bridge interface module 122 may perform a screenshot operation on the virtual extend screen to obtain the 2D content frame of the desktop application 511. In an embodiment, before the bridge interface module 122 moves the desktop application 511 to the virtual extend screen, the desktop application 511 can be switched to operate in the full-screen mode, so that the virtual extend screen only includes the 2D content frame of the desktop application 511 and does not include other operating interfaces of the application. In this way, the bridge interface module 122 may provide the 2D content frame of the desktop application 511 to the 3D display service module 123 for subsequent operations.

Figure 6:
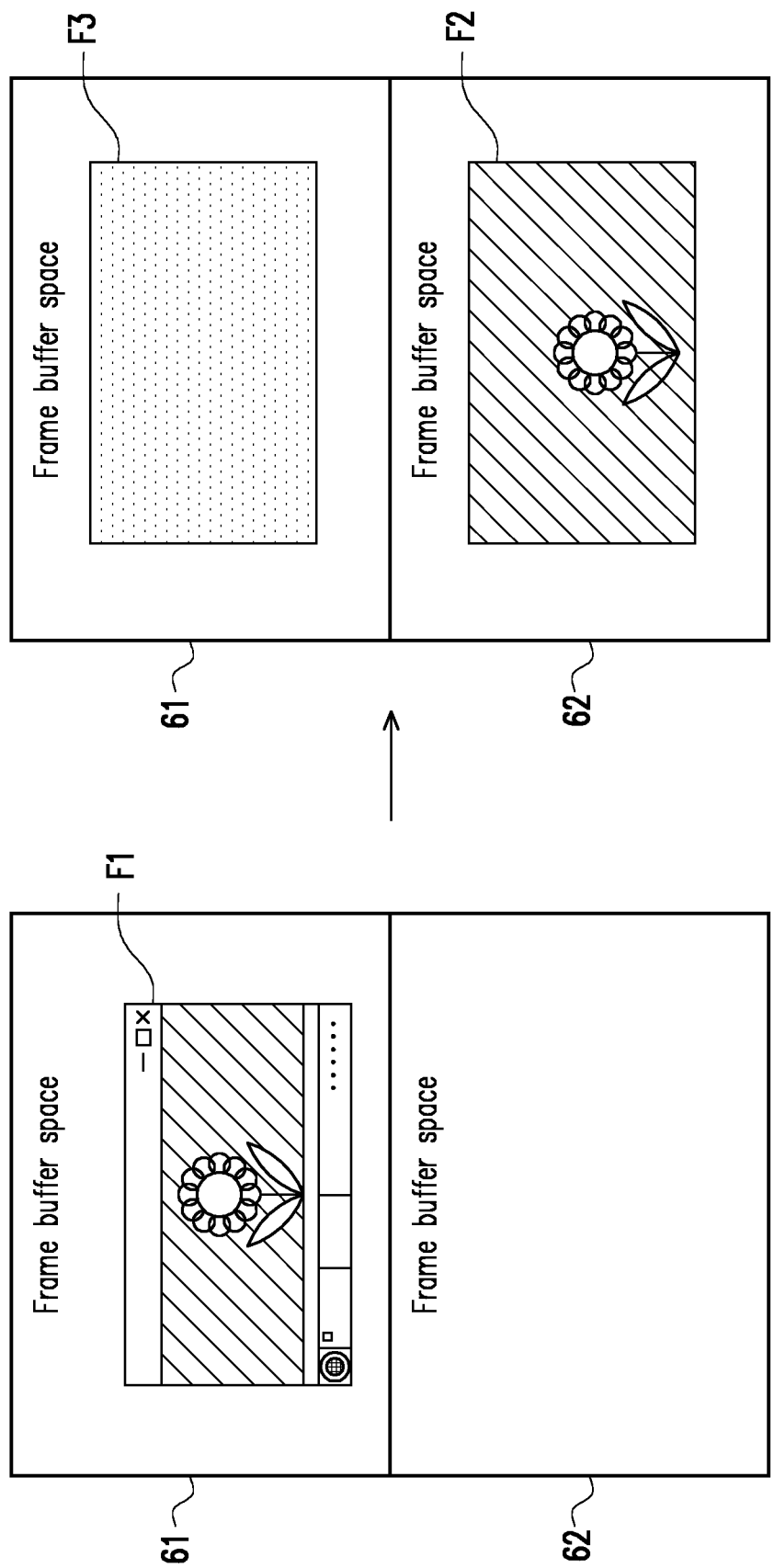
FIG. 6 is a block diagram of frame buffer spaces in a memory according to an embodiment of the invention.

FIG. 6 is a block diagram of frame buffer spaces in a memory according to an embodiment of the invention. Referring to FIG. 6, after the virtual extend screen is created, the memory in the 3D display system may include a frame buffer space 62 corresponding to the virtual extend screen and a frame buffer space 61 corresponding to the main display screen. Before the application executed by the processor is moved to the virtual extend screen, the frame buffer space 61 of the main display screen stores an operation screen F1 of the application and the frame buffer space 62 does not store any frame data. Then, after the application executed by the processor is moved to the virtual extend screen, a 2D content frame F2 of the application is recorded in the frame buffer space 62 of the virtual extend screen, so that the bridge interface module 122 may obtain the 2D content frame F2 of the application from the frame buffer space 62. Then, the frame buffer space 61 corresponding to the main display screen will record and store a 3D format frame F3 provided by the 3D display service module 123, so that the 3D display 110 can perform the 3D displaying.

Based on the description of FIG. 6, it can be seen that by moving the application to the virtual extend screen, the bridge interface module 122 may continuously capture multiple 2D content frames of the application from the virtual extend screen to achieve the purpose of continuously generating corresponding 3D format frames. Conversely, if the recommended operations of creating the virtual extend screen and moving the application to the virtual extend screen are not available (i.e., when only the main display screen is configured), the bridge interface module 122 will only capture one 3D format frame after the main display screen displays the 3D format frame F3, and cannot continue to capture the 2D content frames of the application. Consequently, the 3D display system cannot continue to perform the expected 3D displaying based on the 2D content frames of the application.

On the other hand, in an embodiment, for the standardized application 512 that conforms to the Openxr standard or the Openvr standard, the bridge interface module 122 may implement an execution environment (runtime) in which the standardized application 512 can be executed through an interface tool 55. Based on this, the bridge interface module 122 may obtain the 2D content frame of the standardized application 512 through the interface tool 55, and provide the 2D content frame of the standardized application 512 to the 3D display service module 123 for subsequent operations. In addition, in an embodiment, the special development application 513 is developed based on the bridge interface module 122 served as an application interface. Therefore, the special development application 513 can provide the 2D content frame to the 3D display service module 123 through the bridge interface module 122 for subsequent operations.

To sum up, in the embodiments of the invention, the 2D content frames of multiple applications may be converted into the 3D format frames that conform to a specific 3D format without any changes to the applications to enrich the 3D content that can be displayed on the naked-view 3D display. In this way, the user can convert the 2D content frames of various applications into the 3D format for the naked-view 3D display without being limited by the image format so that a wide range of applications can be achieved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:
1. A three-dimensional (3D) display system, comprising:
a 3D display, providing different images for a left eye and a right eye of a viewer at the same time;
a memory, recording a plurality of modules; and
one or more processors, connected to the 3D memory and the memory to access and execute the modules recorded in the memory, the modules comprising:
a bridge interface module, when the processor executes an application, creating a virtual extend screen which is not displayed on the 3D display, moving image content of the application to the virtual extend screen, and obtaining a two-dimensional (2D) content frame of the application from the virtual extend screen by a screenshot function provided by an application programming interface (API) of an operating system; and
a 3D display service module, obtaining the 2D content frame of the application from the bridge interface module, converting the 2D content frame into a 3D format frame that includes a left image and a right image by communicating with a third-party software development kit, and providing the 3D format frame to the 3D display for displaying the left image and the right image in a stereoscopic displaying effect,
wherein the memory comprises a frame buffer space corresponding to the virtual extend screen and a frame buffer space corresponding to a main display screen, and after the image content of the application executed by the processor is moved to the virtual extend screen, the frame buffer space corresponding to the main display screen records the 3D format frame so that the 3D display served as the main display screen displays the 3D format frame,
wherein the modules further comprise a side-by-side image processing module, receiving the 2D content frame of the application from the 3D display service module, and determining whether the 2D content frame conforms to a side-by-side image format; if not, converting the 2D content frame to conform to the side-by-side image format.

2. The 3D display system of claim 1, wherein the 3D display service module converts the 2D content frame into the 3D format frame according to a 3D display parameter provided by the third-party software development kit by using an image weaving function provided by the third-party software development kit.

3. The 3D display system of claim 1, wherein the 3D display service module transfers the 3D format frame to a main display screen so that the 3D display displays the 3D format frame.

4. The 3D display system of claim 3, wherein the bridge interface module moves the application executed by the processor to the virtual extend screen in response to a user operation, and the 3D display switches from displaying an operation screen associated with the application to displaying the 3D format frame in response to the user operation.

5. A three dimensional (3D) display method adapted to a 3D system, comprising:
when an application is executed by a processor, creating a virtual extend screen which is not displayed on a 3D display, and moving image content of the application to the virtual extend screen;
obtaining a two-dimensional (2D) content frame of the application from the virtual extend screen by a screenshot function provided by an application programming interface (API) of an operating system;
converting the 2D content frame into a 3D format frame that includes a left image and a right image by communicating with a third-party software development kit; and providing the 3D format frame to the 3D display for displaying the left image and the right image in a stereoscopic displaying effect, wherein the 3D display provides different images for a left eye and a right eye of a viewer at the same time, wherein the method further comprises:

after the image content of the application executed by the processor is moved to the virtual extend screen, recording the 2D content frame in a frame buffer space corresponding to the virtual extend screen, recording the 3D format frame in a frame buffer space corresponding to the main display screen so that the 3D display served as the main display screen displays the 3D format frame, the method further comprising:

determining whether the 2D content frame conforms to a side-by-side image format; and if not, converting the 2D content frame to conform to the side-by-side image format.

6. The 3D display method of claim 5, wherein the step of converting the 2D content frame into the 3D format frame by communicating with the third-party software development kit comprises:

converting the 2D content frame into the 3D format frame according to a 3D display parameter provided by the third-party software development kit by using an image weaving function provided by the third-party software development kit.

7. The 3D display method of claim 5, wherein the step of providing the 3D format frame to the 3D display for displaying comprises:

transferring the 3D format frame to a main display screen so that the 3D display displays the 3D format frame.

8. The 3D display method of claim 7, wherein the application is moved to the virtual extend screen in response to a user operation, and the 3D display switches from displaying an operation screen associated with the application to displaying the 3D format frame in response to the user operation.

9. A three dimensional (3D) display system, comprising:

a 3D display, providing different images for a left eye and a right eye of a viewer at the same time;

a memory, recording a plurality of modules; and one or more processors, connected to the 3D memory and the memory to access and execute the modules recorded in the memory for:

when an application is executed by a processor, creating a virtual extend screen which is not displayed on the 3D display, and moving image content of the application to the virtual extend screen;

obtaining a 2D content frame of the application from the virtual extend screen by a screenshot function;

obtaining a 3D display parameter associated with the 3D display; and converting the 2D content frame into a 3D format frame that includes a left image and a right image according to the 3D display parameter and an image weaving function and providing the 3D format frame to the 3D display for displaying the left image and the right image in a stereoscopic displaying effect, wherein the memory comprises a frame buffer space corresponding to the virtual extend screen and a frame buffer space corresponding to the main display screen, and after the image content of the application executed by the processor is moved to the virtual extend screen, the frame buffer space corresponding to the main display screen records the 3D format frame so that the 3D display served as the main display screen displays the 3D format frame, wherein the processor executes the modules for: determining whether the 2D content frame conforms to a side-by-side image format; if not, converting the 2D content frame to conform to the side-by-side image format.

10. The 3D display system of claim 9, wherein the processor executes the modules for: transferring the 3D format frame to a main display screen so that the 3D display displays the 3D format frame.

11. The 3D display system of claim 10, wherein the processor executes the modules for: moving the application executed by the processor to the virtual extend screen in response to a user operation, wherein the 3D display switches from displaying an operation screen associated with the application to displaying the 3D format frame in response to the user operation.

* * * * *